Patented Nov. 22, 1932

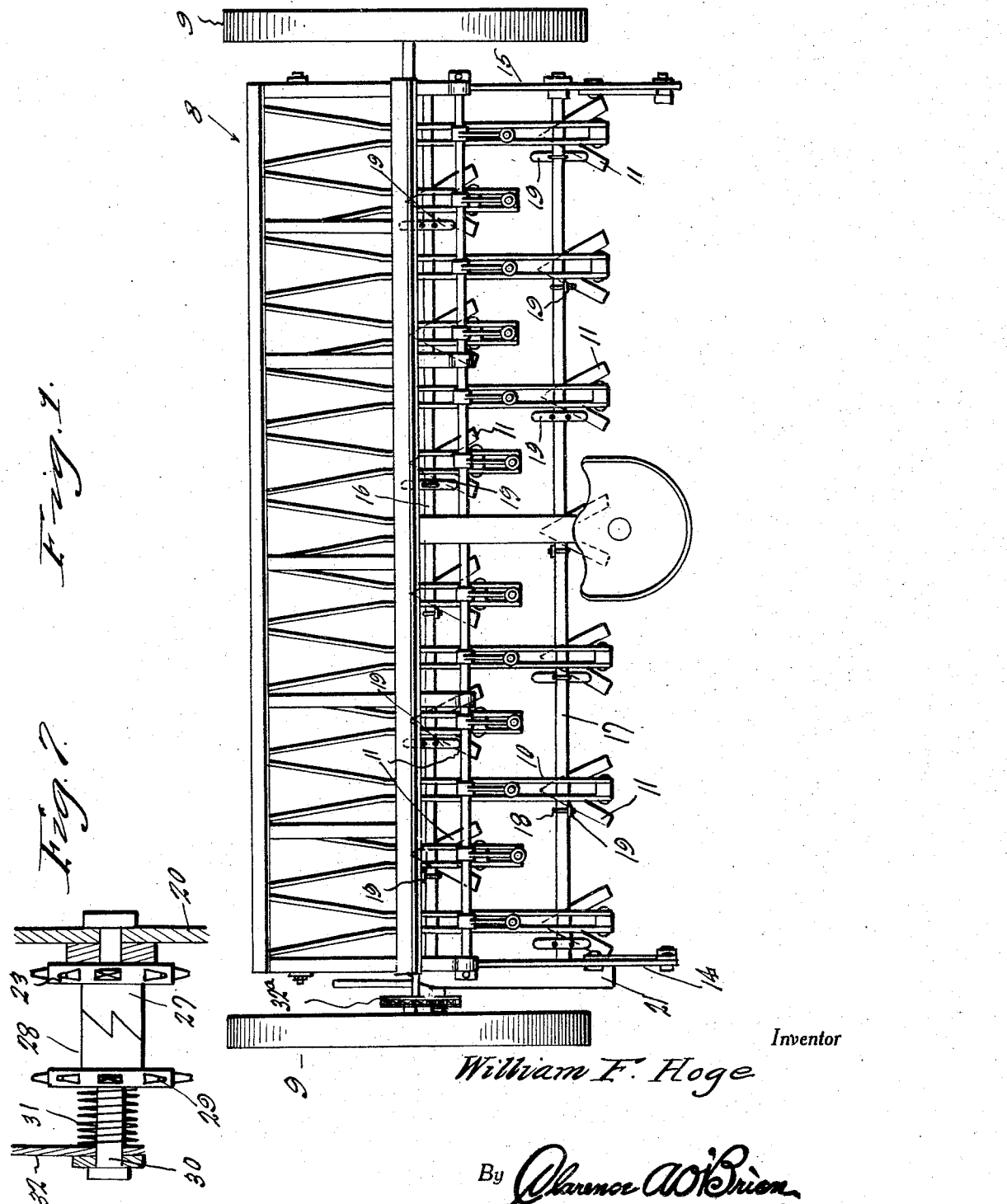

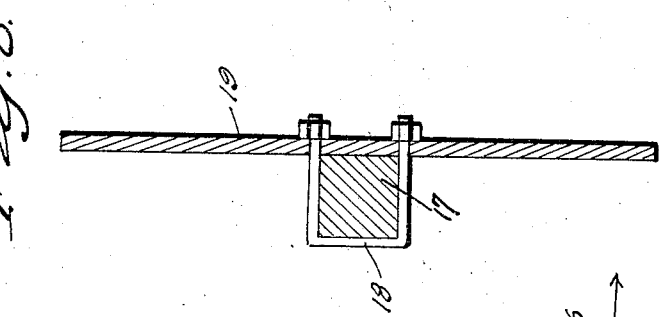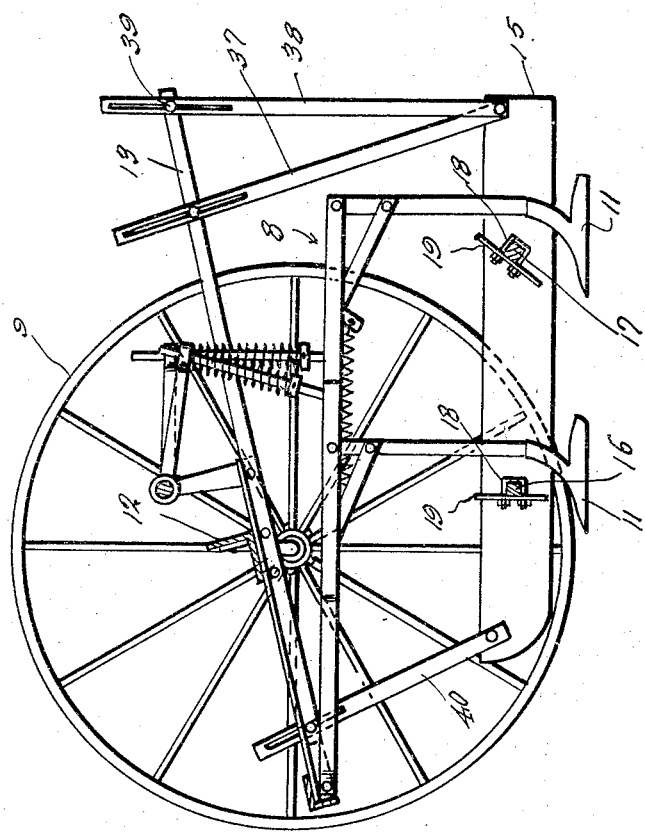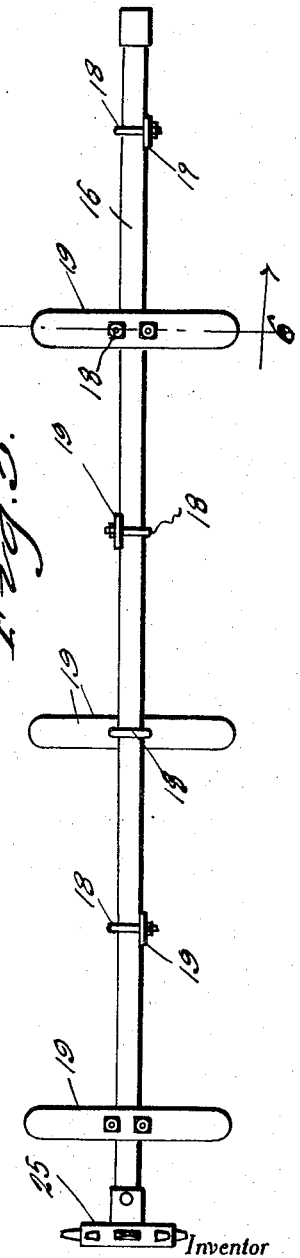

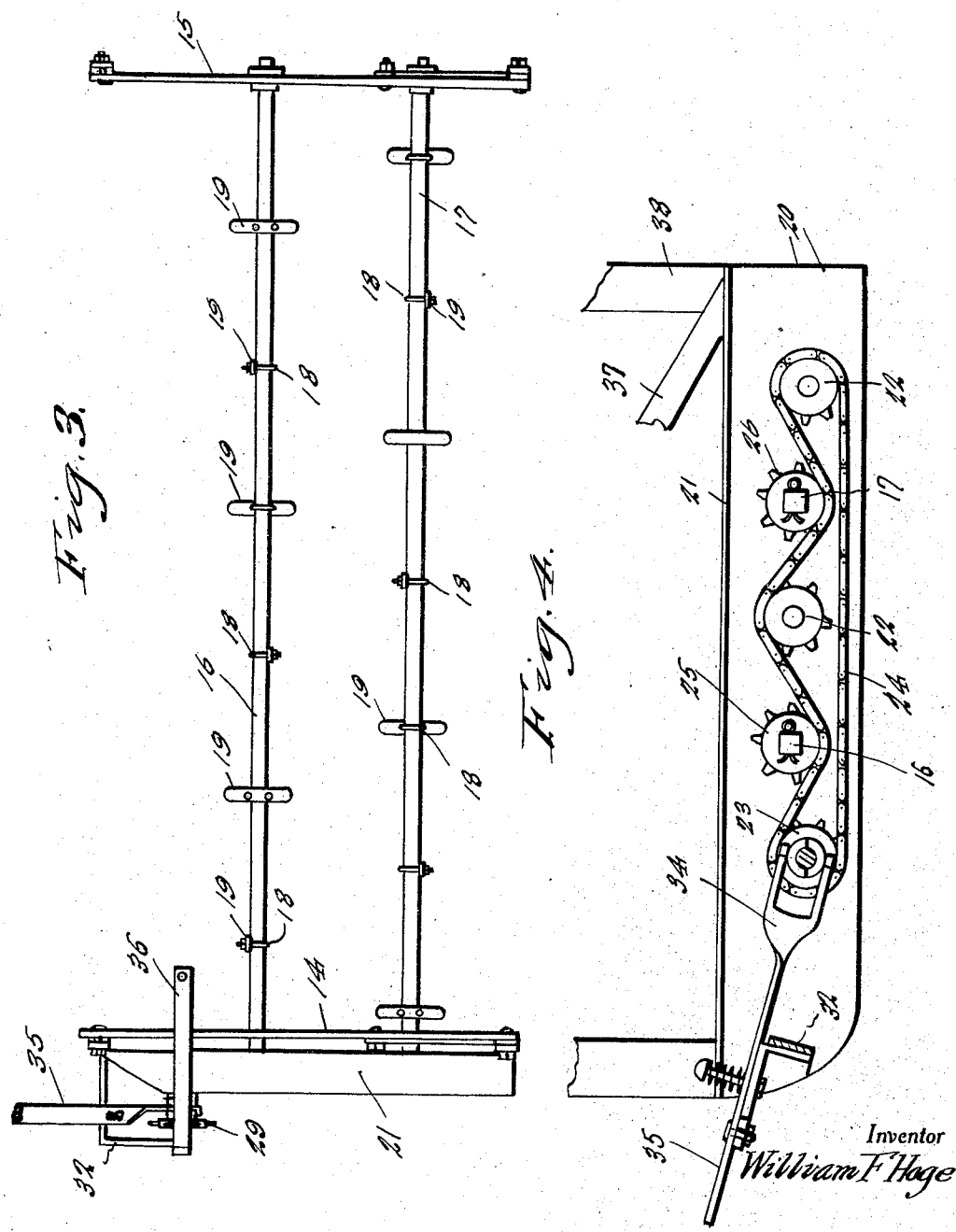

1,888,764

UNITED STATES PATENT OFFICE

WILLIAM F. HOGE, OF GREAT FALLS, MONTANA

CLEANING ATTACHMENT FOR DUCK FOOT CULTIVATORS

Application filed July 28, 1931. Serial No. 553,639.

This invention relates to an improved trash and weed cleaning attachment for conventional cultivators of the type having multiple duck foot equipped teeth.

Cultivators of the aforesaid type are used to success for eradicating fields of quack grass, weeds and the like. Persons skilled in the art to which the invention relates know that in order to insure success of summer fallowing, it is necessary to cut down the weeds which rob the soil of moisture, to keep the soil open so it will hold the rainfall, and to keep the surface mulched to prevent evaporation.

Fallow ground, as is well known in the industry, is littered and thickly infested with weeds, making it necessary to cultivate the field effectively and often.

Present day cultivators employed for this purpose, as far as I am aware, are subject to objection because of the fact that the duck feet become clogged with rubbish and weeds thus severely interfering with the conditioning of the ground.

With this thought in mind, I have discovered the need for means applicable to cultivators of this class for cleaning the duck feet as the machine is operated.

In carrying the inventive conception into practice, I have found it expedient and practical to accomplish the desired result by utilizing an attachment capable of application to a standard type of cultivator without requiring alterations in the existing or stock parts, the attachment embodying rotary cleaning teeth co-operable with adjacent portions of the so-called duck feet in such a manner as to keep the latter clean and free to perform effective ground preparation work.

The particular details utilized in the development of the improved attachment will become more readily apparent from the following description and drawings.

In the drawings:

Figure 1 is a plan view of a conventional cultivating machine equipped with an attachment constructed in accordance with the present invention.

Figure 2 is a cross section of the structure seen in Figure 1.

Figure 3 is a plan view of the attachment per se.

Figure 4 is an end view of the attachment observing it in a direction from left to right in Figure 3.

Figure 5 is a detail view of one of the rotary cleaning devices.

Figure 6 is a section on the line 6—6 of Figure 5.

Figure 7 is a detail view of the socket clutch arrangement.

As seen in Figures 1 and 2, the conventional frame structure of the cultivator is designated generally by the numeral 8 and the wheels are indicated at 9. The depending teeth are represented at 10 and the duck feet are denoted by the numerals 11. The numerals 12 and 13 designate bar members of the super frame structure also of common construction.

The improved attachment embodies a pair of spaced parallel end bars 14 and 15 having bearings to accommodate the end portions of the rotary cleaner shafts 16 and 17. These shafts, as seen in Figure 6, are polygonal in cross section. Adjustably fastened on each shaft by staples 18 are cleaner teeth 19. I provide any suitable number of cleaning teeth and each tooth comprises a flat blade having rounded end portions and secured intermediate its ends to the shaft by way of the clip 18, as detailed in Figure 6.

These teeth are arranged in spiral sequence or order at longitudinally spaced points on the shafts 16 and 17 and the teeth of one shaft are preferably staggered with those of the other shaft. Arranged in close spaced parallelism to the end bar 14 is a runner 20 having a right angularly and outwardly bent flange 21 at its top. This plate 20 serves as a mounting for the power transmission means, which comprises idler sprockets 22 arranged in alinement with a main power supply sprocket 23 as seen in Figure 7. A sprocket chain 24 is trained over this trio of sprocket wheels. It is also engageable with sprocket wheels 25 and 26 keyed on the end portion of the shafts 16 and 17 as disclosed plainly in Figure 4.

As seen better in Figure 7, the sprocket wheel 23 is provided with a clutch element 27 co-operable with a companion clutch element 28 carried by a complemental sprocket wheel 29 mounted for rotation on the stub shaft 30. The numeral 31 merely designates a spring surrounding the shaft 30 and interposed between the frame 32 and sprocket wheel 29. The sprocket wheel 29 receives power from a sprocket chain 32a driven from the adjacent ground wheel 9 as shown in Figure 1.

The numeral 34 in Figure 4 designates the fork of an operating clutch throw lever 35, this lever being pivoted on the aforesaid frame 32. Any suitable means may be provided for holding the clutch lever in releasing position. Incidently, as seen in Figure 3, the numeral 36 designates an element adapted for securing the adjacent end portion of the attachment to the frame of the cultivator. The attachment as a whole is adjustably mounted on the cultivator frame and in accomplishing this I have found it practical and expedient to utilize two duplicate sets of hanger bars as seen in Figure 2. The rear hangers are arranged in upwardly diverging relationship designated by the numerals 37 and 38, the upper ends being slotted for adjustable connection to the bar 13 as indicated at 39. There is a similar shorter hanger bar at 40 to connect the front end of the attachment to the corresponding end of the cultivator frame.

Briefly visualized, it is obvious that the attachment is characterized by a horizontally disposed frame made up of members to accommodate the spaced parallel rotary shaft, said shaft carrying the adjustable cleaner teeth, and the teeth being located in close proximity to the duck feet of the cultivator so that during the time of rotation weeds, trash and the like will be disposed of in such a manner as to prevent clogging of such duck feet.

At one end of the attachment frame structure is a multiple sprocket wheel and chain drive for rotating the cleaner tooth shafts in unison and this driving assembly embodies a manually regulated clutch arrangement so as to permit the attachment to be operated according to the discretion of the attendant.

The attachment frame is suspended by slotted hanger bars adjustably attached to the superposed frame structure of the cultivator whereby to permit the attachment frame to be raised or lowered to dispose the cleaning teeth at the most effective elevation.

The teeth are individually mounted, susceptible of easy repair, and capable of appropriate adjustment so as to secure the desired continuity in the cleaning operation.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired without departing from the spirit and scope of the appended claims.

I claim:

1. A cleaning attachment of the class described comprising a pair of spaced parallel end bars having bearings, a pair of spaced parallel shafts mounted for rotation in said bearings, each shaft being of polygonal cross section, a plurality of flat blade cleaning teeth, U-clips for adjustably securing said cleaning teeth on said shafts, and upstanding slotted hanger bars secured to said end bars and adapted for adjustable connection to a cultivator frame.

2. A cleaning attachment of the class described comprising a pair of duplicate end bars, a plurality of vertically disposed hanger and attaching bars secured to said end bars and adapted for adjustable mounting on a cultivator frame, a pair of spaced parallel polygonal shafts having their end portions mounted for rotation in bearings in said end bars, cleaning teeth adjustably and spirally arranged on said shafts, a flanged plate fastened to one of said end bars, a plurality of sprocket wheels carried by said plate, the adjacent ends of said shafts extending through apertures in said plate and being provided with additional sprocket wheels, a chain operably associated with all of said sprocket wheels, and means to drive the said chain to rotate the said shafts.

3. A cleaning attachment of the class described comprising a pair of duplicate end bars, a plurality of vertically disposed hanger and attaching bars secured to said end bars and adapted for adjustable mounting on a cultivator frame, a pair of spaced parallel polygonal shafts having their end portions mounted for rotation in bearings in said end bars, cleaning teeth adjustably and spirally arranged on said shafts, a flanged plate fastened to one of said end bars, a plurality of sprocket wheels carried by said plate, the adjacent ends of said shafts extending through apertures in said plate and being provided with additional sprocket wheels, a chain operably associated with all of said sprocket wheels, one of said sprocket wheels being provided with a clutch element, a complemental driven sprocket wheel having a companion clutch element, and a clutch lever associated with said last named sprocket wheel.

In testimony whereof I affix my signature.

WILLIAM F. HOGE.